US008913310B2

(12) United States Patent
Osakabe et al.

(10) Patent No.: US 8,913,310 B2
(45) Date of Patent: Dec. 16, 2014

(54) IMAGE READING DEVICE

(71) Applicant: Brother Kogyo Kabushiki Kaisha, Nagoya-shi, Aichi-ken (JP)

(72) Inventors: Yoshinori Osakabe, Seto (JP); Katsuro Miura, Toyota (JP); Takashi Ohama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/202,273

(22) Filed: Mar. 10, 2014

(65) Prior Publication Data

US 2014/0185113 A1    Jul. 3, 2014

Related U.S. Application Data

(63) Continuation of application No. 13/433,531, filed on Mar. 29, 2012, now Pat. No. 8,687,247.

(30) Foreign Application Priority Data

Jun. 30, 2011    (JP) ................. 2011-146181

(51) Int. Cl.
*H04N 1/04*    (2006.01)
*H04N 1/203*    (2006.01)
*H04N 1/00*    (2006.01)

(52) U.S. Cl.
CPC .......... *H04N 1/00572* (2013.01); *H04N 1/203* (2013.01)
USPC ............................. 358/498; 358/496; 358/497

(58) Field of Classification Search
USPC .................. 358/495–498, 474, 486
See application file for complete search history.

(56) References Cited

U.S. PATENT DOCUMENTS 6,438,350 B1    8/2002    Hasegawa et al.
7,145,698 B2    12/2006    Yamamoto
(Continued)

FOREIGN PATENT DOCUMENTS

EP    1292104 A1    3/2003
JP    H11-032164 A    2/1999
(Continued)

OTHER PUBLICATIONS

Extended EP Search Report dtd May 27, 2013, EP Appln. 12161520.7.

(Continued)

*Primary Examiner* — Barbara Reinier
(74) *Attorney, Agent, or Firm* — Banner & Witcoff, Ltd.

(57)    ABSTRACT

An image reading device includes a conveyor unit that conveys a document along a conveying path for ADF-type image scanning including a curved path. The conveyor unit includes a conveyor roller that reverses a conveying direction of the document in the curved path. The device further includes a first contact surface that comes into contact with a first side of the document when the document is conveyed, a second contact surface that comes into contact with a second side of the document when the document is conveyed, a first reading unit that reads an image on the first side of the document, and a second reading unit disposed above the second contact surface and reading an image on the second side of the document. A part of the conveyor roller is disposed lower than the first and second contact surfaces in an up down direction of the image reading device.

8 Claims, 4 Drawing Sheets

(56) References Cited

U.S. PATENT DOCUMENTS

| | | |
|---|---|---|
| 7,202,983 B2 | 4/2007 | Yokota et al. |
| 8,749,856 B2 * | 6/2014 | Osakabe ................ 358/474 |
| 2003/0038989 A1 | 2/2003 | Yokota et al. |
| 2003/0063336 A1 | 4/2003 | Cho |
| 2003/0063337 A1 | 4/2003 | Shirai et al. |
| 2007/0002401 A1 | 1/2007 | Park |
| 2009/0027738 A1 | 1/2009 | Kim |
| 2013/0063751 A1 * | 3/2013 | Miura et al. ............ 358/1.13 |
| 2013/0088761 A1 | 4/2013 | Kim |
| 2014/0009804 A1 * | 1/2014 | Osakabe et al. ......... 358/498 |

FOREIGN PATENT DOCUMENTS

| | | |
|---|---|---|
| JP | 2000-115452 A | 4/2000 |
| JP | 2000-332953 A | 11/2000 |
| JP | 2003-315935 A | 11/2003 |
| JP | 2006-180257 A | 7/2006 |
| JP | 2006-180259 A | 7/2006 |
| JP | 2009-088952 A | 4/2009 |
| JP | 4306985 B2 | 8/2009 |
| JP | 2010-239188 A | 10/2010 |

OTHER PUBLICATIONS

May 27, 2014—(JP) Notice of Reasons for Rejection—App 2013-117564—Eng Trans.

Aug. 19, 2014—(JP) Decision of Final Rejection—App 2013-117564—Eng Tran.

* cited by examiner

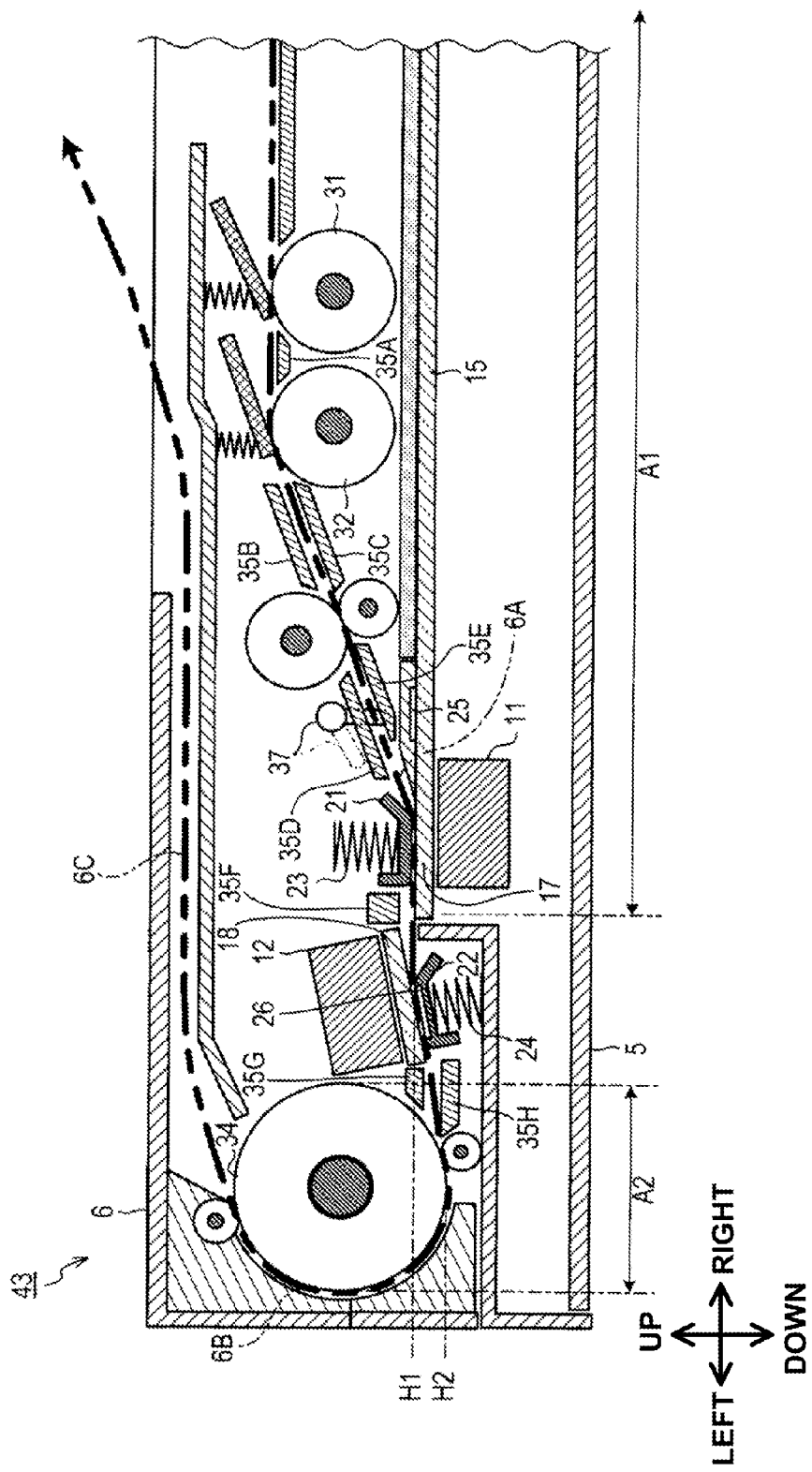

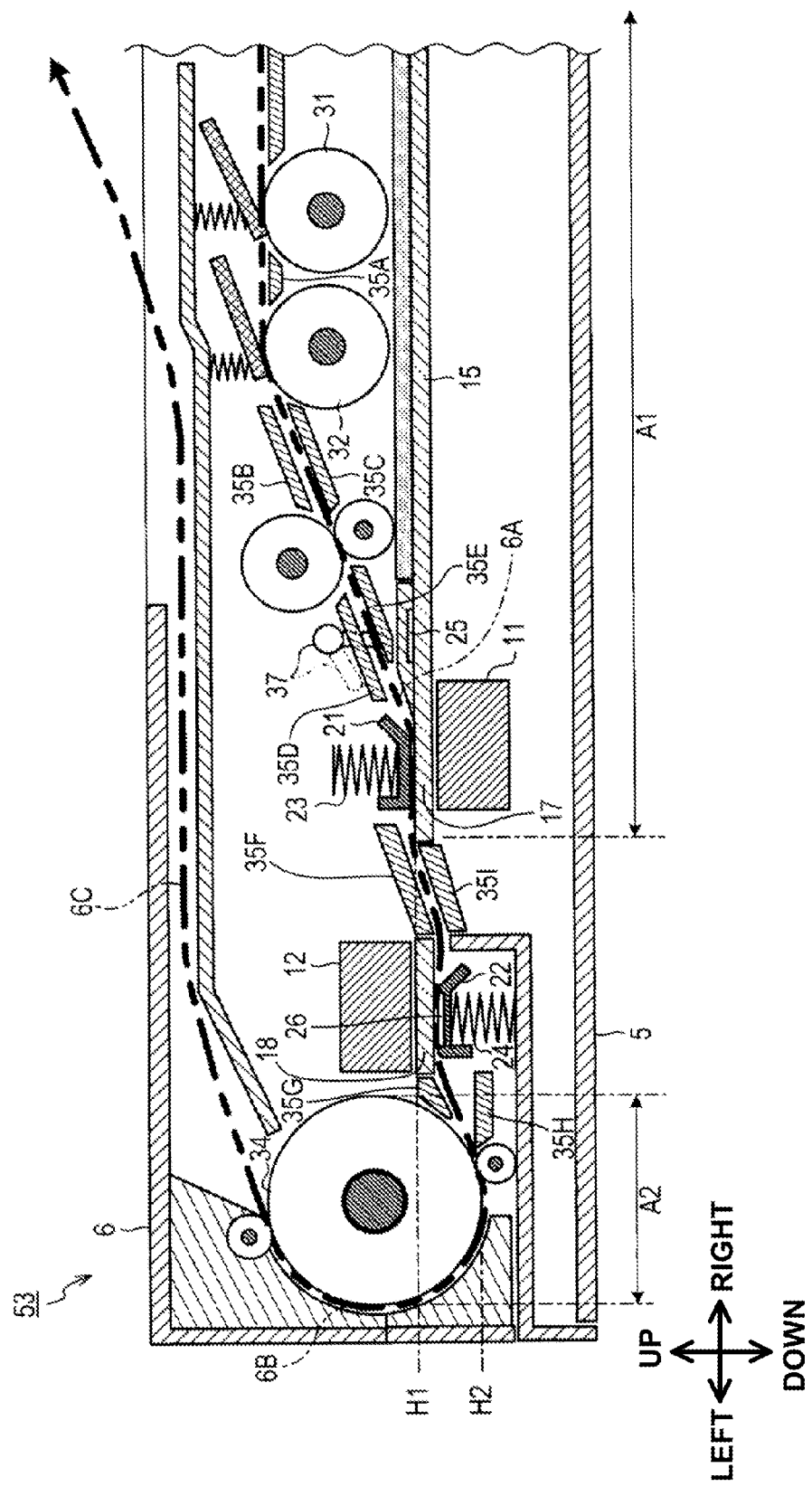

IMAGE READING DEVICE

CROSS REFERENCE TO RELATED APPLICATION

This application is a continuation of prior U.S. application Ser. No. 13/433,531, filed Mar. 29, 2012, which claims priority from Japanese Patent Application No. 2011-146181, filed on Jun. 30, 2011, the entire subject matter of which is incorporated herein by reference.

TECHNICAL FIELD

Aspects of the disclosure relates to an image reading device configured to read images on both sides of a document.

BACKGROUND

A known image reading device includes a flatbed-type image scanner and an automatic document feeder (ADF), which is disposed at a top of the flatbed-type image scanner.

The known image reading device includes two image sensors. When the image reading device is used as an ADF-type image scanner, the image reading device reads images on both sides of a document at substantially the same time.

More specifically, a first image sensor is used when the image reading device is used as the flatbed-type image scanner. When the device is operated a the ADF-type image scanner, the first image sensor is used to read an image on one side of a document while a second image sensor is used to read an image on the other side of the document.

The first image sensor is configured to stay at a position under a contact glass to read an image on the one side of the document that is being conveyed along an upper surface of the platen glass. The second image sensor is fixed at a position above the platen glass and is configured to read an image on the other side of the document that is being conveyed along the upper surface of the platen glass.

SUMMARY

However, in the known image reading device, a document conveying path in the ADF-type image scanner includes a U-shaped portion, which is disposed above an upper surface of the contact glass, i.e., a stationary document holding surface. With this configuration, a height of the image reading device may become large and it may be difficult to reduce the height of the image reading device.

Therefore, an image reading device that can overcome these and other shortcomings would be beneficial. An image reading device that has a reduced height may be provided including an image reading device having a curved portion in a document conveying path.

BRIEF DESCRIPTION OF THE DRAWINGS

Illustrative aspects of the disclosure will be described in detail with reference to the following figures in which like elements are labeled with like numbers and in which:

FIG. 3 is a schematic vertical sectional view showing an image reading device in a second illustrative embodiment according to one or more aspects; and FIG. 4 is a schematic vertical sectional view showing an image reading device in a third illustrative embodiment according to one or more aspects.

DETAILED DESCRIPTION

Figure 1A:
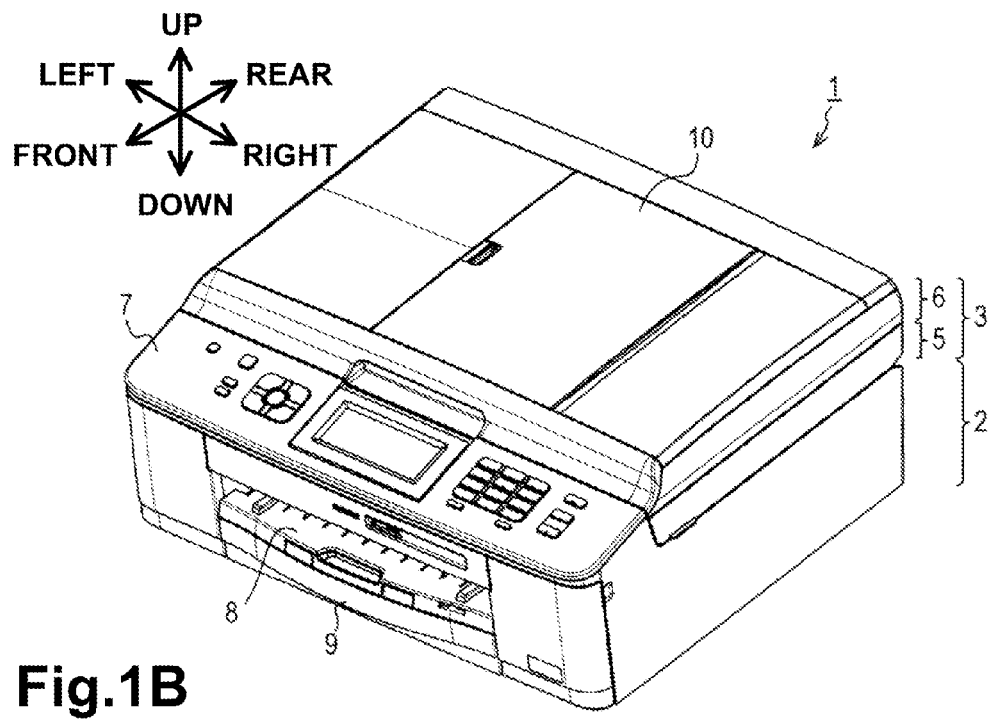
FIGS. 1A and 1B are perspective views showing an appearance of a multifunction peripheral including an image reading device in an illustrative embodiment according to one or more aspects of the invention.
Figure 1B:
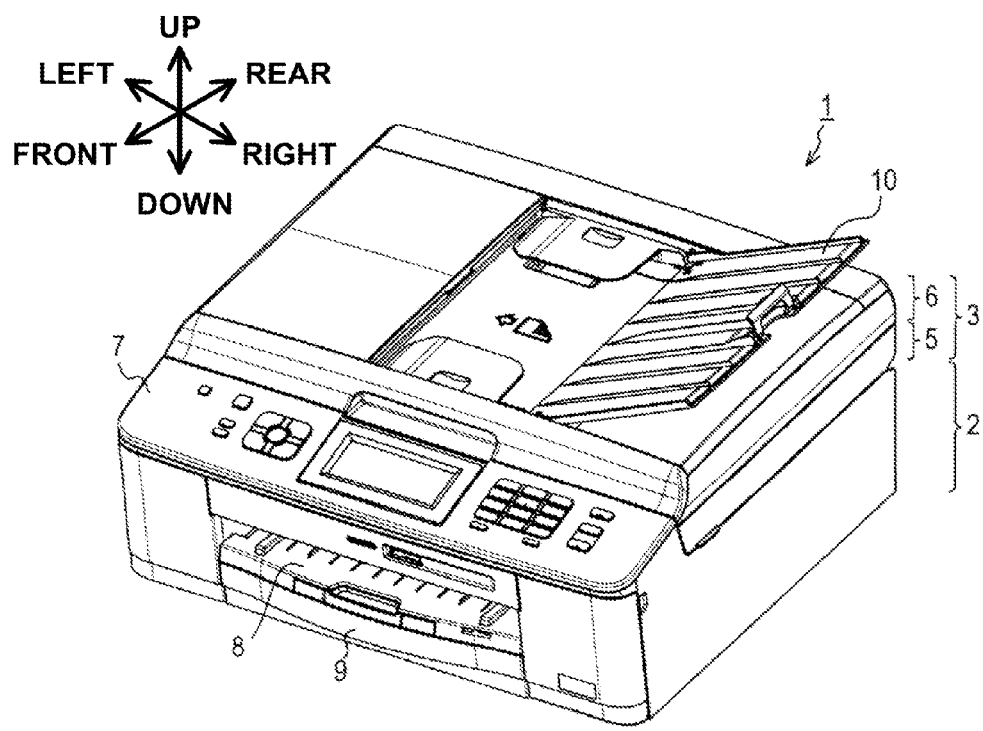

Illustrative embodiments will be described in detail with reference to the accompanying drawings. As shown in FIGS. 1A and 1B, a multifunction peripheral 1 has various functions, e.g., a printing function, a copying function, and a facsimile data transmitting/receiving function, as well as a scanning function, which is a function of an image reading device. Hereinafter, description will be made with reference to directions, e.g., up, down, right, left, front and rear, as shown in the drawing of FIG. 1A in order to explain relative positional relationships among each unit that the multifunction peripheral 1 comprises.

The multifunction peripheral 1 comprises a printer unit 2 and a scanner unit 3. The scanner unit 3 is disposed above the printer unit 2. The scanner unit 3 comprises an automatic document feeder (ADF) in a cover portion of a flatbed-type image scanner. The scanner unit 3 further comprises a scanner portion 5, which is a lower part thereof, and an ADF portion 6, which is an upper part thereof.

The printer unit 2 comprises a control panel 7 that is disposed at an upper front part of the printer unit 2. The control panel 7 is configured to be operated by a user. The printer unit 2 further comprises a sheet feed cassette 9 that is configured to be attachable to and detachable from a lower part of the printer unit 2. The sheet feed cassette 9 is configured to accommodate one or more recording media on which printing is to be performed. The printer unit 2 has a discharge port 8 above the sheet feed cassette 9. A recording medium on which printing is performed is discharged from the discharge port 8.

The scanner unit 3 is configured to pivot about an axis, which extends in a right-left direction near a rear edge of the scanner unit 3, with respect to the printer unit 2. In accordance with the pivoting of the scanner unit 3, the scanner unit 3 is configured to be movable between a position where the scanner unit 3 covers an upper opening of the printer unit 2 and a position where the scanner unit 3 uncovers the upper opening of the printer unit 2.

The ADF portion 6 is configured to pivot about an axis, which extends in the right-left direction near a rear edge of the ADF portion 6, with respect to the scanner portion 5. In accordance with the pivoting of the ADF portion 6, the ADF portion 6 is configured to be movable between a position where the ADF portion 6 covers a document holding surface defined by an upper surface of the scanner portion 5 and a position where the ADF portion 6 uncovers the document holding surface.

An openable cover portion 10 is disposed at a top of the ADF portion 6. The cover portion 10 serves as a cover that covers an upper opening of the ADF portion 6 when closed as shown in FIG. 1A. The cover portion 10 also serves as a tray that holds one or more documents, which are to be conveyed by the ADF portion 6 for scanning, and also receives one or more discharged documents, which were conveyed by the ADF portion 6, when opened as shown in FIG. 1B.

Figure 2:
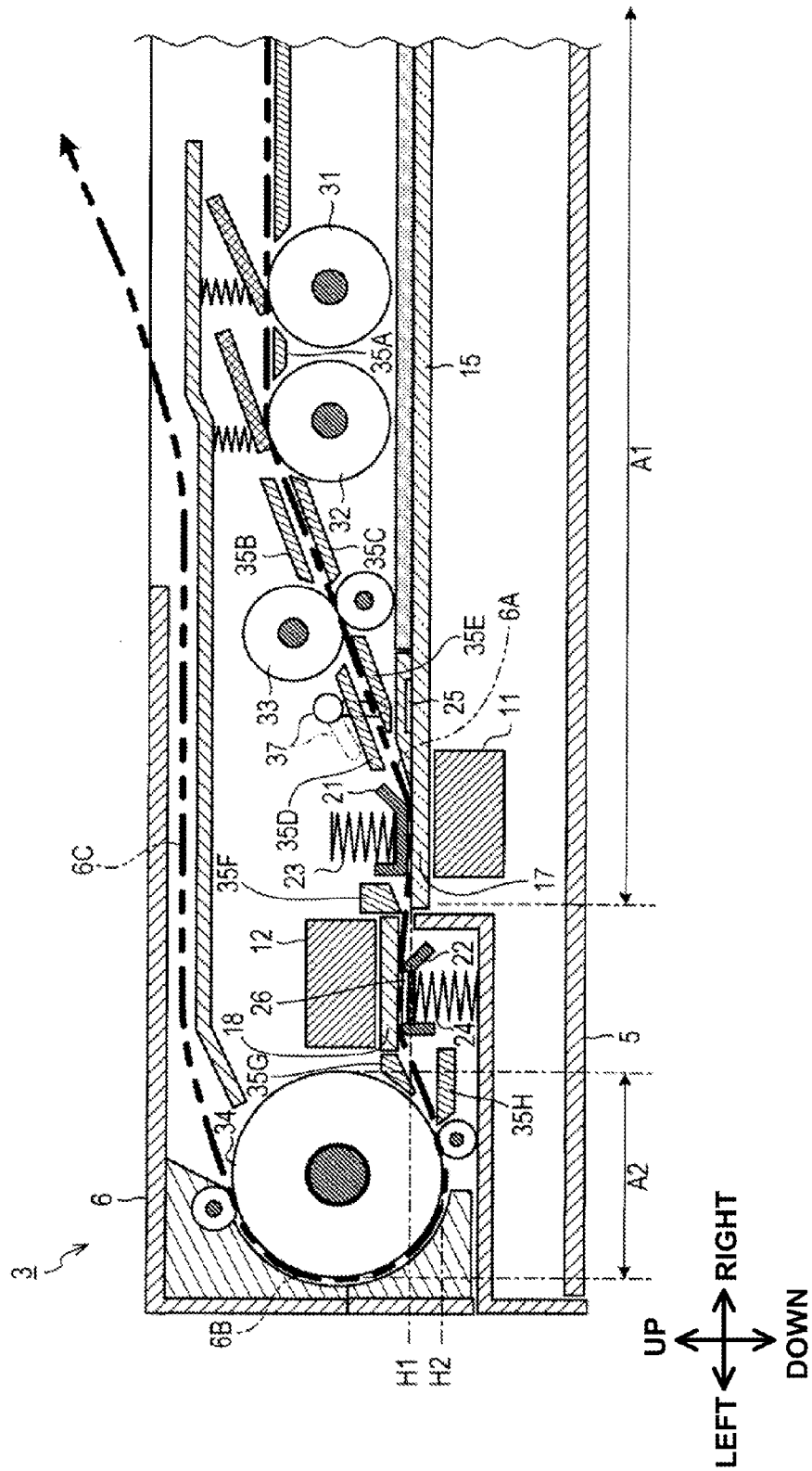
FIG. 2 is a schematic vertical sectional view showing an image reading device in a first illustrative embodiment according to one or more aspects.

As shown in FIG. 2, the scanner unit 3 comprises first and second reading units, for example, a first image sensor 11 and a second image sensor 12, respectively, which are both contact image sensors in this illustrative embodiment.

The first image sensor 11 is disposed in the scanner portion 5 and is configured to reciprocate in the right-left direction by a motor (not shown). The second image sensor 12 is fixed in the ADF portion 6.

In the scanner portion 5, a transparent portion for stationary document 15 and a first transparent portion for moving document 17 are disposed above the reciprocation path of the first image sensor 11. In the ADF portion 6, a second transparent portion for moving document 18 is disposed under the second image sensor 12.

The transparent portion for stationary document 15 and the first transparent portion for moving document 17 define an upper surface of the scanner portion 5. In this illustrative embodiment, a single glass plate constitutes the transparent portion for stationary document 15 and the first transparent portion for moving document 17. Another glass plate is used for the second transparent portion for moving document 18.

Separate glass plates may be used for the transparent portion for stationary document 15 and the first transparent portion for moving document 17. Material other than glass may be used for the transparent portion for stationary document 15 and the first and second transparent portions for moving document 17, 18 if the material is transparent and the first and second image sensors 11, 12 can read a document therethrough.

In the ADF portion 6, a first document pressing member 21 is disposed above the first transparent portion for moving document 17. In the scanner portion 5, a second document-pressing member 22 is disposed under the second transparent portion for moving document 18.

The first document pressing member 21 is urged downward by a compression spring 23 to lightly press the upper surface of the first transparent portion for moving document 17. An upper end of the compression spring 23 is supported by a frame (not shown) in the ADF portion 6 and a lower end of the compression spring 23 is supported by an upper surface (a surface opposite to a surface facing the first transparent portion for moving document 17) of the first document pressing member 21.

The second document pressing member 22 is urged upward by a compression spring 24 to lightly press a lower surface of the second transparent portion for moving document 18. An upper end of the compression spring 24 is supported by a lower surface (a surface opposite to a surface facing the second transparent portion for moving document 18) of the second document pressing member 22 and a lower end of the compression sprint 24 is supported by the frame in the ADF portion 6.

A first white color reference portion 25 is disposed between the transparent portion for stationary document 15 and the first transparent portion for moving document 17 in the right-left direction in the scanner portion 5. The first white color reference portion 25 is in contact with the upper surface of the glass plate constituting the transparent portion for stationary document 15 and the first transparent portion for moving document 17. In shading correction of the first image sensor 11, the first image sensor 11 reads the first white color reference portion 25 through the glass plate to correct white balance of the read image.

A second white color reference portion 26 is disposed at the upper surface of the second document pressing member 22. The second white color reference portion 26 is in contact with the lower surface of the glass plate of the second transparent portion for moving document 18. The second white color reference portion 26 is disposed to fit in a document pressing surface of the second document pressing member 22. In shading correction of the second image sensor 12, the second image sensor 12 reads the second white color reference portion 26 through the glass plate to correct white balance of the read image.

The ADF portion 6 comprises a plurality of rollers, e.g., a supply roller 31, a separating roller 32, a relay roller 33, and a reverse roller 34, which are disposed along a document conveying path (indicated by a double-dotted and dashed line in FIG. 2). The document conveying path comprises a lower path 6A, a curved path 6B, and an upper path 6C, respectively, from upstream to downstream in the document conveying path. Guides 35A-35H are disposed between the rollers 31-34 to guide a moving document along the document conveying path. The reverse roller 34, e.g., a conveyor roller, is configured to convey a document and reverse a conveying direction of the document such that the document is substantially U-turned.

A document sensor 37 is disposed downstream of the relay roller 33 and upstream of the first document pressing member 21 in the document conveying path. The document sensor 37 is configured to be movable between a non-detecting position and a detecting position. When a leading edge of a document reaches the document sensor 37, the document sensor 37 contacts the document. Thus, the document sensor 37 moves from the non-detecting position to the detecting position and is turned from an off state to an on state. When a trailing edge of the document passes the document sensor 37, the document sensor 37 no longer detects the document. Thus, the document sensor 38 moves from the detecting position to the non-detecting position and is turned from the on state to the off state. Therefore, the positions of the leading and trailing edges of the document can be detected by observing the switching of the state of the document sensor 37 between the on state and the off state.

When the scanner unit 3 is used as the ADF-type scanner in the multifunction peripheral 1 configured as described above, one or more documents are placed in the ADF portion 6. In this state, a scan instruction is provided to the multifunction peripheral 1 by an input such as an input received by the control panel 7 or by remote control from a personal computer (not shown). A user can arbitrarily specify either of a one-sided scanning or a double-sided scanning when providing the scan instruction.

When the multifunction peripheral 1 receives the scan instruction, the multifunction peripheral 1 initializes each unit or portion therein. The multifunction peripheral 1 performs shading correction of the first and second image sensors 11, 12 as part of the initialization process. At that time, the first image sensor 11 moves to a position under the first white color reference portion 25 in the right-left direction and performs shading correction by reading the first white color reference portion 25 at that position. Then, the first image sensor 11 moves to a position under the first document pressing member 21 in the right-left direction and comes to a standstill at that position. Because the second image sensor 12 is fixed facing the second white color reference portion 26, the second image sensor performs the shading correction by reading the second white color reference portion 26 at that position.

After the initialization process, the rollers in the ADF portion 6 start rotating. At that time, one or more documents supplied from the upstream end of the conveying direction by the supply roller 31 are separated one by one by the separating roller 32 and each separated document is conveyed downstream in the conveying direction. The document is then further conveyed downstream by the relay roller 33 and passes between the first transparent portion for moving document 17 and the first document pressing member 21.

The front-rear direction of the multifunction peripheral 1 corresponds to a main-scanning direction. The conveying direction corresponds to a sub-scanning direction. When the document reaches the position facing the first image sensor 11, the first image sensor 11 reads an image on a first side of the document moving in the sub-scanning direction by repeatedly reading pixels arranged in the main-scanning direction on the document. The timing at which the document reaches the position facing the first image sensor 11 equals a time elapsed since the document is conveyed by a predetermined distance from a timing at which the document sensor 37 detected the leading edge of the document.

The document passed between the first transparent portion for moving document 17 and the first document pressing member 22 then passes between the second transparent portion for moving document 18 and the second document pressing member 22. When the document reaches the position facing the second image sensor 12, the second image sensor 12 reads an image on a second side of the document by repeatedly reading pixels arranged in the main-scanning direction on the document. The timing at which the document reaches the position facing the second image sensor 12 equals a time elapsed since the document is conveyed by a predetermined distance from a timing at which the document sensor 37 detected the leading edge of the document.

The document passed between the second transparent portion for moving document 18 and the second document pressing member 22 then reaches the reverse roller 34. The document is substantially U-turned along a circumference of the reverse roller 34 and then is discharged onto the upper surface of the scanner unit 3.

When the scanner unit 3 is operated as the flatbed-type scanner in the multifunction peripheral 1, the ADF portion 6 is pivoted to open and a document is placed on the transparent portion for stationary document 15. That is, the upper surface of the transparent portion for stationary document 15 serves as the document holding surface. In this condition, a scan instruction is provided to the multifunction peripheral 1 by an input such as an input received by the control panel 7 or by remote control from the personal computer (not shown).

When the multifunction peripheral 1 receives the scan instruction, the multifunction peripheral 1 performs the initialization process to initialize each unit or portion. The multifunction peripheral 1 performs shading correction of the first image sensor 11 as part of the initialization process. The description of the shading correction of the first image sensor 11 will be omitted because it has already been described above.

After initialization process, the first image sensor 11 reads an image on a first or second side of the stationary document by repeatedly reading pixels arranged in the main-scanning direction on the document while moving in the sub-scanning direction.

In the multifunction peripheral 1 configured as described above, as shown in FIG. 2, an area A2, in which the reverse roller 34 is disposed, does not overlap an area A1, in which the first image sensor 11, the transparent portion for stationary document 15 and the transparent portion for moving document 17 are disposed, when viewed from a direction perpendicular to the document holding surface of the transparent portion for stationary document 15. By providing the non-overlapping of the area A1 and the area A2 and a space on the left of the second document pressing member 22 and the compression spring 24, the reverse roller 34 can be disposed such that its lower end position H2 is located lower than a reference plane H1, which extends on substantially the same plane as the document holding surface in the height direction.

With this configuration, the reverse roller 34 is located lower in the height direction than a conveyor roller of the known image reading device in which the curved path 6B is located above the upper surface of the transparent portion for stationary document 15. Therefore, the document conveying path in the ADF portion 6 may be located at a lower position correspondingly. In addition, the height of the scanner unit 3, and by extension the height of the multifunction peripheral 1, may be reduced.

In the multifunction peripheral 1 configured as described above, the reverse roller 34 includes a single roller. Therefore, a curvature of the curved path 6B may be readily made to design and a smaller number of bearings for supporting the reverse roller 34 may be required as compared with a configuration in which a conveying path, which is equivalent to the curved path 6B, is defined by a plurality of conveyor rollers. In addition, a mechanism for transmitting a drive force from a drive source to the conveyor rollers may not need to be installed in the image reading device. Accordingly, the multifunction peripheral 1 may have a simple configuration.

In the multifunction peripheral 1 configured as described above, the second image sensor 12 and the second transparent portion for moving document 18 are disposed between the lower path 6A and the upper path 6C. Therefore, the space between the lower path 6A and the upper path 6C may be effectively used as compared with a case where the second transparent portion for moving document 18 and the second image sensor 12 are disposed under the lower path 6A or above the upper path 6C. With this configuration, the height of the multifunction peripheral 1 may be reduced.

In the multifunction peripheral 1 configured as described above, the second document pressing member 22 is disposed such that at least a part thereof is located lower than the reference plane H1, e.g., document holding surface. Therefore, the second document pressing member 22 may be disposed at a lower position in the height direction as compared with the known image reading device in which an equivalent to such a second document pressing member is disposed higher than the reference plane H1. This configuration may contribute to the reduction of the height of the scanner unit 3.

Hereinafter, second and third illustrative embodiments will be described with reference to FIGS. 3 and 4. An explanation will be given mainly for the parts different from the first illustrative embodiment, and an explanation will be omitted for the common parts by assigning the same reference numerals thereto.

According to the second illustrative embodiment shown in FIG. 3, in a scanner unit 43, the second image sensor 12, the second transparent portion for moving document 18, and the second document pressing member 22 are inclined with respect to a horizontal plane.

More specifically, the second transparent portion for moving document 18 is disposed such that its right end is located near the first transparent portion for moving document 17 and its left end is located near the reverse roller 34. The document contact surface of the second transparent portion for moving document 18 is included from right to left. Therefore, when a document is conveyed downstream from the position where the document makes contact with the first transparent portion for moving document 17 in the document conveying path along the reference plane H1, a leading edge of the document makes contact with the document contact surface of the second transparent portion for moving document 18.

The scanner unit 43 configured as described above also provides the same effects as those provided by the scanner unit 3 according to the first illustrative embodiment. In addition, the leading edge of the document makes contact with the inclined document contact surface of the second transparent portion for moving document 18 in the document conveying path between the first transparent portion for moving document 17 and the lower end of the reverse roller 34. The inclined document contact surface is inclined toward the reverse roller 34. With this configuration, the document may contact the document contact surface of the second transparent portion for moving document 18 by itself as compared with a case where the document contact surface of the second transparent portion for moving document 18 is not inclined, e.g., horizontal surface. Accordingly, the document conveying path may be positioned along the document contact surface of the second transparent portion for moving document 18 without having to use, for example, a guide portion, to forcibly direct the document conveying path to the document contact surface. Thus, the document may be smoothly conveyed in the document conveying path. In addition, the second transparent portion for moving document 18 is inclined toward the circumference of the reverse roller 34, which is disposed downstream of the second transparent portion for moving document 18. Thus, the leading edge of the document may enter the curved path 6B smoothly.

The third illustrative embodiment of the invention will be described with reference to FIG. 4. A distance between the first image sensor 11 and the second image sensor 12 disposed in a scanner unit 53 in the right-left direction is greater than a distance between the first image sensor 11 and the second image sensor 12 disposed in the scanner unit 3 in the right-left direction according to the first illustrative embodiment. The second image sensor 12, the second transparent portion for moving document 18, and the second document pressing member 22 are disposed lower than in the first illustrative embodiment in the height direction.

Therefore, guides 35F, 35I are disposed in a space between the first transparent portion for moving document 17 and the second transparent portion for moving document 18 to guide a leading edge of a moving document to the lower-surface side of the second transparent portion for moving document 18.

The scanner unit 53 configured as described above also provides the same effects as those provided by the scanner unit 3 according to the first illustrative embodiment. The reverse roller 34 may be disposed lower than the reverse roller 34 of the scanner unit 3 according to the first illustrative embodiment. The height of the portion where the reverse roller 34 is disposed may be further reduced and thus the height of the multifunction peripheral 1 may be reduced.

While the disclosure has been described in detail with reference to specific illustrative embodiments thereof, it would be apparent to those skilled in the art that various changes, arrangements and modifications may be applied therein without departing from the spirit and scope of the disclosure.

In the above-described illustrative embodiments, the conveying direction along the reverse roller 34 is defined such that a document is conveyed from below upward in the document conveying path along the reverse roller 34. Nevertheless, in other illustrative embodiments, for example, the conveying direction along the reverse roller 34 may be reversed such that a document is conveyed from above downward in the document conveying path along the reverse roller 34.

In the above-described illustrative embodiments, the features have been described in a multifunction peripheral 1 as an example. Nevertheless, in other illustrative embodiments, for example, an image reading device may not have any functions other than the scanning function. Aspects may be adopted in, for example, a single-function image reading device having a scanning function.

What is claimed is:

1. An image reading device comprising:
    a document holding member comprising a first surface and a second surface opposite to the first surface, the first surface being configured to hold a first document thereon;
    a document conveyor unit configured to convey a second document along a conveying path, the conveying path including a curved path, the document conveyor unit including a first conveyor roller configured to convey the second document along the curved path;
    a document contact surface configured to come into contact with one surface of the second document when the document conveyor unit conveys the second document; and
    an image sensor disposed below the second surface of the document holding member in a height direction and facing the document contact surface,
    wherein the first conveyor roller is disposed to intersect a plane, which extends along the first surface of the document holding member.

2. The image reading device according to claim 1, wherein a part in the height direction of the image reading device is perpendicular to a direction of the plane.

3. The image reading device according to claim 1, wherein the document contact surface is in the plane.

4. The image reading device according to claim 3, wherein the document contact surface is a part of the first surface of the document holding member.

5. The image reading device according to claim 1, wherein a part of the conveying path is in the plane.

6. The image reading device according to claim 1, wherein the document conveyor unit further comprises a second conveyor roller, the second conveyor roller being located below the plane and configured to convey the second document along the curved path.

7. The image reading device according to claim 1, wherein the curved path includes a U-shape portion that extends around an outer peripheral portion of the first conveyor roller.

8. The image reading device according to claim 1, wherein a downstream end of the curved path is disposed above an upstream end of the curved path in the height direction.

\* \* \* \* \*